(12) United States Patent
Zhang et al.

(10) Patent No.: US 8,904,137 B1
(45) Date of Patent: Dec. 2, 2014

(54) DEDUPLICATION SYSTEM SPACE RECYCLING THROUGH INODE MANIPULATION

(75) Inventors: Xianbo Zhang, Madison, WI (US); Wenxin Wang, Beijing (CN)

(73) Assignee: Symantec Corporation, Mountain View, CA (US)

( * ) Notice: Subject to any disclaimer, the term of this patent is extended or adjusted under 35 U.S.C. 154(b) by 312 days.

(21) Appl. No.: 13/106,097

(22) Filed: May 12, 2011

(51) Int. Cl.
*G06F 17/30* (2006.01)

(52) U.S. Cl.
CPC .............................. *G06F 17/30135* (2013.01)
USPC ........................................................ 711/165

(58) Field of Classification Search
CPC ..... G06F 3/0647; G06F 3/067; G06F 3/0605; G06F 3/061; G06F 3/0689; G06F 3/0641; G06F 3/0646; G06F 2206/1004; G06F 11/1448; G06F 11/1453; G06F 12/023; G06F 12/0238; G06F 17/30135; G06F 17/30138; G06F 17/30156
USPC ........................................................ 711/165
See application file for complete search history.

(56) References Cited

U.S. PATENT DOCUMENTS

| | | | | |
|---|---|---|---|---|
| 5,551,003 A | * | 8/1996 | Mattson et al. | ............... 711/136 |
| 7,500,077 B2 | * | 3/2009 | Krauss | .......................... 711/170 |
| 7,702,870 B2 | * | 4/2010 | English et al. | ................ 711/165 |
| 2008/0270461 A1 | * | 10/2008 | Gordon et al. | ............ 707/103 R |
| 2011/0093654 A1 | * | 4/2011 | Roberts et al. | ................ 711/105 |

OTHER PUBLICATIONS

Sethuramalingam et al. "Implementation of Insert/Delete System call for the Ext3 file system" published Jan. 17, 2009.*
Arun Ponniah Sethuramalingam et al., "Implementation of Insert/Delete System call for the Ext3 File System," http://www.seclab.cs.sunysb.edu/arunponniah/report/ext3insdel-report.pdf, dated Jan. 17, 2009, pp. 6.

* cited by examiner

*Primary Examiner* — Charles Rones
*Assistant Examiner* — Andrew Russell
(74) *Attorney, Agent, or Firm* — Campbell Stephenson LLP

(57) ABSTRACT

A system and method for improving performance within a storage system employing deduplication techniques using address manipulation are disclosed. A data segment within a storage object is identified from among a number of data segments within a storage object. The data segment represents data stored in a storage device. Some or all of the data represented by the data segment is stored in a data block that is associated with the data segment. The storage object is then compacted. Compaction includes reordering data segments, including the identified data segment, by performing address manipulation on a data block address of the data block (e.g., an address of the data block within the storage device). The reordering of the data segments changes the order of the data segments within the storage object.

20 Claims, 11 Drawing Sheets

DEDUPLICATION SYSTEM SPACE RECYCLING THROUGH INODE MANIPULATION

FIELD OF THE INVENTION

The invention relates generally to storage systems, and more particularly, to improved performance within a storage system employing deduplication techniques through the manipulation of data block addresses.

DESCRIPTION OF THE RELATED ART

The ever-increasing reliance of today's business organizations on information, and their concomitant reliance on computing systems that produce, process, distribute, and maintain such information in its various forms, have resulted in a continually escalating demand for improved data storage techniques, as well as fast, efficient access to the data thus stored. And while data growth is not a new phenomenon, as its pace has become more rapid, the location of data more dispersed, and relationships between data sets more complex, the need for protecting and ensuring the availability of that data has taken on growing importance. To this end, a variety of techniques to protect data have evolved, among which are a variety of backup techniques. In general terms, backing up data involves making one or more copies of the data, such that the additional copies are available for use in restoring the original data, in the event of a data loss event (an event which results in an otherwise permanent loss of data (e.g., intentional and unintentional acts, hardware failures, disasters and the like), as opposed to data unavailability (e.g., a network outage)). However, as will be appreciated, backing up such increasingly large amounts of data carries with it the potential for comparable increases in backup storage requirements.

To help combat the problems created by this explosion of data, a number of techniques have been devised to reduce storage requirements of such data. Among these techniques is data deduplication, which offers business organizations an opportunity to dramatically reduce the storage requirements of data backups, as well as that of other forms of data storage. In so doing, storage systems that implement data deduplication techniques are also able to more efficiently convey deduplicated data (e.g., backup data) from one or more primary locations to one or more backup storages sites.

In general terms, a data deduplication system provides a mechanism for storing a given piece of information only once. Put another way, deduplication storage systems store only data that is unique (i.e., non-redundant), and in so doing, drastically reduce the storage requirements of a data backup, for example. Thus, in a backup scenario, if a piece of information is stored in multiple locations within an enterprise, that piece of information will only be stored once in a deduplicated backup storage system storing the backup data for those locations. Or if the piece of information does not change between a first backup and a second backup, then that piece of information need not be stored during the second backup as long as that piece of information continues to be stored in the deduplicated backup storage area. As will be appreciated, data deduplication can also be employed outside of the backup context, thereby reducing the amount of active storage occupied by files containing duplicate data, for example. In the general sense, then, a deduplication storage system will store a single instance of a data segment, and simply allow multiple files to reference that instance of the data segment, rather than storing multiple instances of thereof, thus reducing the amount of storage space required to store the files.

In order to provide for effective data deduplication, data is preferably divided in a manner that provides a reasonable likelihood of finding duplicated instances thereof. For example, data can be examined on a file-by-file basis, and if duplicate files are identified (e.g., operating system files, application files, data files, and the like), an indication of such duplicate versions of the file stored, without the need to store an identical copy of the file. A drawback of a file-by-file approach to deduplication is that if a small section of a file is modified, a new version of the entire file would be stored, including a potentially large amount of data that remains the same between the versions. A more efficient method of dividing and analyzing data, therefore, is to divide the data into consistently-sized segments (referred to as data segments) and analyze such data segments to identify duplicate data segments, prior to their being stored in the deduplicated data store. Advantageously, then, if only a portion of a large file is modified, only the data segment(s) of data corresponding to the modified portion of the file need be sent to/stored in the deduplicated data store. The remainder of the data segments, which remain unchanged, need not be sent or stored, resulting in a significant savings in computing resources.

Moreover, in order to perform data deduplication, a deduplication system needs to be able to efficiently identify redundant copies of the same data segment. Because of the processing requirements involved in comparing each incoming data segment with each data segment already stored in the deduplicated data store, processing efficiency can be improved through the use of data signatures (referred to as fingerprints), significantly smaller units of information that represent the data segments being compared. By comparing these smaller data signatures, instead of comparing the data segments themselves, significantly smaller amounts of data are communicated and processed, improving the efficiency of data deduplication operations. Fingerprint generation generally involves calculating a "fingerprint" for each data segment (e.g., a data signature such as a hash or checksum), and then comparing that new fingerprint to the existing fingerprints of data segments already stored by the deduplication system. If the new fingerprint matches an existing signature, the result indicates that a copy of the given data segment is already stored in the deduplicated storage system.

In backup architectures employing deduplication techniques, the deduplicated data segments can be stored, for example, in constructs referred to as containers. The data segments (e.g., representing the unique data segments of a backup) are written to such containers as part of a backup operation. Subsequently, in such a scenario, the data segments of the backup may be deleted from the container. Over time, such containers may therefore develop "holes" throughout the container (e.g., areas of empty storage space resulting from the deletion of data segments no longer needed). As will be appreciated, the holes thus created are typically not contiguous.

When storing new data segments in a container, such new data segments are preferably stored in a contiguous fashion. This is typically the case because a given group of data segments will share some amount of logical and temporal locality (e.g., a group of data segments representing the data from a backup operation of a given client's data, at a given point in time). Thus, by contiguously storing such data segments in a container, their common logical and temporal locality can be maintained to at least some extent. Unfortunately, reusing a container's holes for storing such new data segments is therefore less than ideal in this regard, as doing so risks destroying the logical and temporal locality such data segments would otherwise exhibit if stored in a contiguous fashion (e.g., if "filling" a container's holes with the new data segments would result in their being spread throughout the container's storage area, thereby resulting in degraded performance during backup and restore operations). Thus, it would be desirable to provide a technique that allows new data segments to be stored in a contiguous fashion, preferably in as computationally-efficient a manner as possible.

SUMMARY OF THE INVENTION

Various systems and methods for compacting a storage object within a deduplication system are disclosed. For example, one method involves identifying a data segment, from among a number of data segments, within a storage object. The identified data segment represents data stored in a storage device. At least a portion of this data is stored in a data block associated with the identified data segment. The method then involves compacting the storage object, which reorders a set of data segments of the data segments (which includes the identified data segment). The set of data segments are reordered by performing address manipulation on a data block address of the data block. As a result, the order of the set of data segments within the storage object is changed.

In one embodiment, the identified data segment is a deleted data segment and the data segments are in order within the storage object. The deleted data segment is in a first location in the order within the storage object, prior to the reordering, and in a second location (e.g., a location closer to the first end of the order than the first location) in the order, subsequent to the reordering. In another embodiment, another data segment from the number of data segments is an active data segment. The active data segment is in a third location in the order within the storage object, prior to the reordering, and in a fourth location (e.g., a location closer to the second end of the order than the third location) in the order, subsequent to the reordering.

In yet another embodiment, the identified data segment and the data block are associated with one another by mapping information. In addition, the storage object can be a container that includes a container index file and a container data file. The mapping information can be represented by a structure of an inode of such a container data file.

In a further embodiment, the identified data segment is a deleted data segment and the compacting recycles storage space in the container occupied by the deleted data segment. The storage space in the container is recycled by moving the storage space occupied by the deleted data segment to the end of the container. The storage space can be moved by changing the mapping information. Mapping information can be changed by assigning a new block number to each of the one or more deleted data segments, where the new block number is located after block numbers assigned to active data segments within the storage object.

The method can also involve creating a copy of the mapping information, prior to compacting the storage object.

In another embodiment, the reordering of the set of data segments involves retrieving the mapping information into a data structure, prior to the address manipulation. The mapping information in the data structure is then modified.

In yet another embodiment, the mapping information maps the data blocks of the data segments to the data block addresses of the data represented by the data segments. The data segments are in an order within the storage object, and the data block addresses are in a sequence within the mapping information.

The method can further involve determining if the compacting was successful. If the compaction was successfully completed, the method then involves invalidating an entry in a page cache, where the entry corresponds to a page containing a copy of the at least a portion of the data.

In another embodiment, the method involves determining whether the reordering would result in an unacceptable level of fragmentation. In this case, the identified data segment is a deleted data segment and the data segments include one or more active data segments. If it is determined that the reordering would result in an unacceptable level of fragmentation, the method then involves writing the one or more active data segments to a spare storage object, and swapping the storage object and the spare storage object. In a further embodiment, the storage object is defragmented, subsequent to the swapping.

An example of a system can include one or more processors, a storage device, and a memory, in which the storage device and memory are coupled to the processors. The memory stores program instructions executable to perform the aforementioned method of compacting a storage object, as described above. Such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
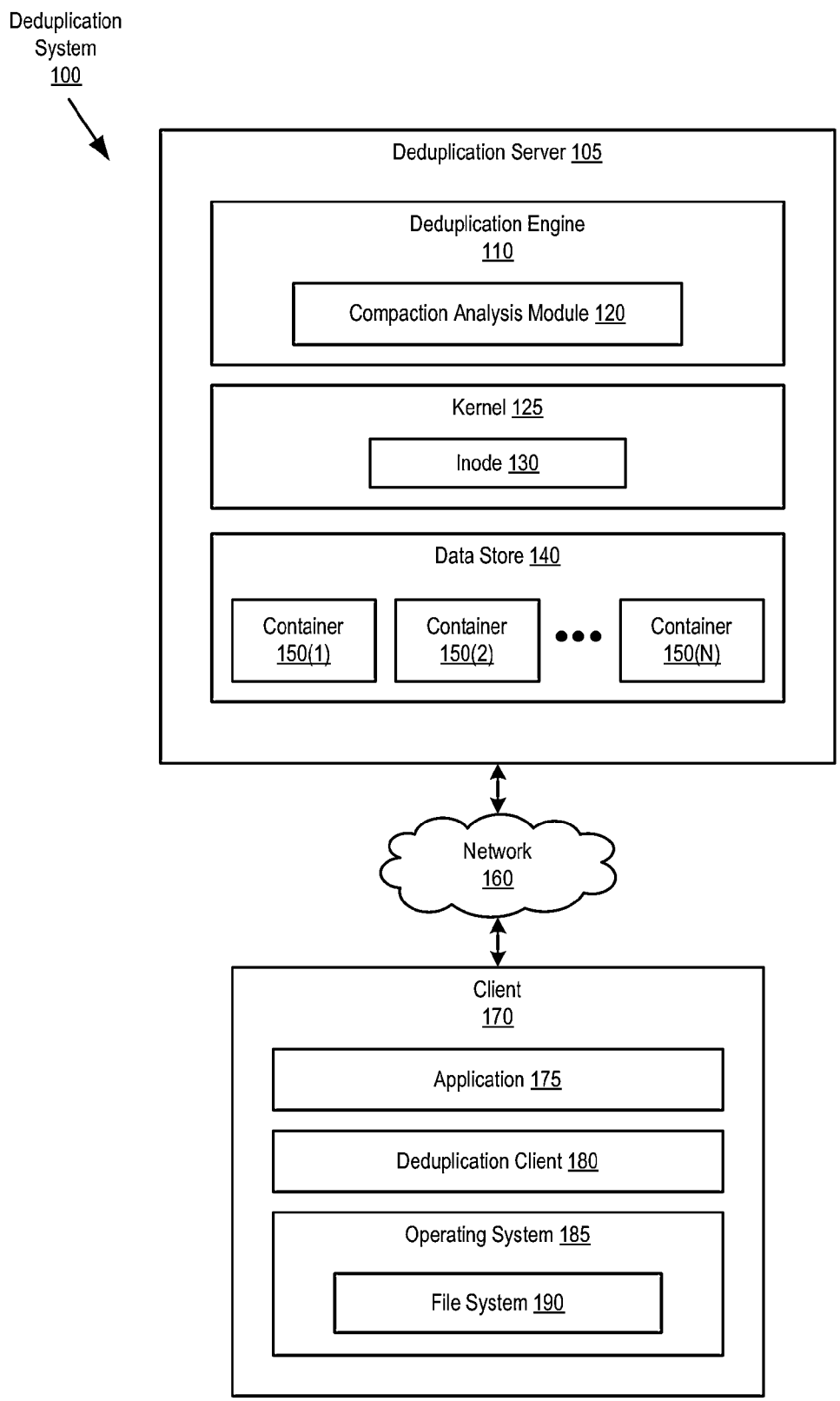
FIG. 1 is a block diagram showing a deduplication system for performing storage space recycling, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

As is described in greater detail below, the instant disclosure generally relates to methods and systems for compacting containers in deduplication storage systems, and more specifically, in a more efficient and less storage input/output (I/O) intensive manner. The phrase "deduplication storage system," as used herein, generally refers to any type or form of storage system or device capable of identifying redundant data patterns within data sets (e.g., backed-up files) and eliminating such redundancy by only storing a single instance of such data. As will be described in greater detail below, this single instance of data may be referenced by a single file or a number of files making reference to the deduplication storage system.

As noted earlier, backing up large amounts of data can consume comparably large amounts of storage space. As part of the deduplication process, backup data is broken up into chunks of data (referred to herein, in general terms, as data segments), which, for example, follow file boundaries. Files subjected to a backup operation often contain some number of data segments that are the same (i.e., duplicates). Deduplication eliminates these duplicate data segments, and instead, upon storing one instance of a given data segment, maintains information regarding the stored data segment and all other instances of the same data segment. Thus, as noted, data deduplication avoids the storage of duplicate copies of data segments, thereby reducing the amount of storage space needed to store such data segments. The unique data segments (e.g., non-duplicate data segments) are then stored within a storage object such as a container (e.g., some manner of data structure designed for the storage of such data segments), which is itself stored in a storage device (whether a physical storage device, a virtual storage device, or combination thereof, as noted subsequently herein).

As also noted, the deletion of various of a container's data segments can, over time, cause a container to acquire the aforementioned holes (e.g., due to an expired backup image). This state of a container having some number of such holes is referred to herein as "container fragmentation." Because these holes are typically non-contiguous within the container, such holes offer a less than ideal alternative for use in storing new data segments, due to the risk of losing data segment locality. To address such situations (and so, maintain data segment locality), unused areas of a container can be consolidated into one (or possibly some acceptably small number of) region(s) of contiguous unused storage area(s). Such an operation is referred to herein as "compacting" the container (e.g., by way of a "compaction operation").

In such a compaction operation, the unused storage areas of a container are rearranged, for example, by rearranging the data segments within the container, such that available storage space in the container is made available as contiguous storage in the container's data file by changing the data segments' order within the container (i.e., reordering the data segments within the container such that deleted data segments are "moved" to one end of the container, and active data segments are "moved" to the other end of the container). In one scenario, the compaction operation moves unused storage areas (e.g., the storage areas used by the deleted data segments) to the "end" of the container (in apposition to whichever end of the container is considered to be the container's "beginning") to allow for the storage of new data segments within the container in a contiguous manner. Alternatively, the data segments that have not been deleted (referred to herein as "active" data segments) can be read from one container and written to the "beginning" of another (spare) container. In any event, it will be appreciated that, in light of the present disclosure, it is desirable to compact containers having an unacceptable level of container fragmentation, in order to provide maximum (or at least, sufficient) contiguous storage space within the container thus compacted. In this regard, it should be appreciated that, also in light of the present disclosure, the level of container fragmentation is an indication of the extent to which active data segments and deleted data segments (or regions of unused storage corresponding to locations in which data segments might be stored) have become intermingled. This is to be distinguished from what is referred to herein as address fragmentation (e.g., fragmentation caused by inode manipulation, such as in the case in which a substantial portion of the data segments' data blocks end up being out-of-sequence, when accessed in a sequential fashion via the inode of a container's container data file, making read/write operations less efficient), or disk fragmentation (e.g., the typical case of fragmentation of data on a physical disk caused by the reading and writing of data over time, though less likely to be a subject of concern in the scenarios addressed herein as a result of the contiguous nature of the storage locations used in creating containers' container data files).

Unfortunately, moving data is a resource-intensive operation, and, because such compaction operations involve moving data within or between containers (by reading and writing that data), such compaction operations are typically costly from the perspective of storage input/output (I/O) throughput. While situations may exist in which moving data in this manner is, in fact, desirable, an approach in which such operations are performed as a matter of course carries with it the aforementioned costs. An approach that avoids these costs, even to a modest extent, can therefore offer significant benefits.

To address these issues, a compaction operation according to embodiments described herein compacts a storage object (e.g., a container) by "moving" the affected storage areas (e.g., data segments) within the given storage object using address manipulation, thus reordering the storage object's storage areas without the need to read or write the data represented by those storage areas. For example, in performing such operations on a container's data segments, a set of data segments is "moved" by manipulating the address information of the data block(s) in which the set of data segments' data is stored (and so, with which the set of data segments is associated; such a set of data segments including some number of the data segments within the container being compacted; such an operation being referred to herein, in general terms, as "recycling," when discussed in terms of "moving" deleted data segments). For example, such compaction can be accomplished by recycling storage areas corresponding to a container's deleted data segments (i.e., holes) to the end of that container by manipulating the address information of the deleted data segments' data blocks (such an operation being referred to herein, in general terms, as the recycling of such holes, with the technique for manipulating such data block addresses referred to herein, more specifically, as "inode manipulation"). However, as will be appreciated in light of the present disclosure (and in general terms of performing such compaction operations), a container can be compacted by either of (or some combination of) using such address manipulation to move active data segments to one end of the given container and/or deleted data segments to the other end of the given container. Such compaction operations are now described in greater detail, in connection with FIGS. 1-9.

FIG. 1 illustrates an example of a system designed to perform compaction operations, in order to maintain data segment locality and thus, for example, improve backup and restore performance. Further, such a system is designed to do so while providing improved performance of compaction operations by manipulating data block address information of data segments stored in a container (e.g., the addresses of the data segments' data blocks within the storage device, as stored in the container's inode (or comparable structure)), rather than having to move data segments to different locations within the container (or to another container). As shown, FIG. 1 illustrates a deduplication system 100. Deduplication system 100 includes a deduplication server 105. Deduplication server 105, in turn, includes a deduplication engine 110 (which further includes a compaction analysis module 120), a kernel 125 (which further includes an inode 130), and a data store 140 (which further includes a number of containers 150(1)-(N)). Deduplication system 100 also includes a network 160 and a client 170. Client 170 further includes an application 175, a deduplication client 180, and an operating system 185 with file system 190.

In such a system, duplicate copies of data that are to be stored (e.g., data files, data segments or the like, stored as part of a backup operation) are eliminated in an effort to reduce the storage capacity needed to store such data. For example, in the manner noted earlier, if client 170 seeks to back up emails including 10 instances of the same file attachment, all 10 instances of the file would be backed up and stored requiring 10 times the amount of storage space. Using a deduplication technique, deduplication server 110 need only store one instance of the attachment. To further reduce storage requirements, the given data file can be broken up into data segments, and only the unique ones thereof stored on deduplication server 105. With only the unique data thus stored on deduplication server 105, deduplication server 105 can then reference each subsequent instance of the attachment (e.g., file or data segments thereof) to the saved instance of the data, thereby conserving storage space within deduplication server 105. As will be appreciated, such deduplication can be performed by either of deduplication client 180 or deduplication server 105, or by a combination of the two, with various of the deduplication operations handled by each separately and/or cooperatively.

In deduplication system 100, deduplication server 105 acts as a central repository of data. Such data can be received, for example, from client 170 and/or other client systems (not shown) that may also be connected to deduplication server 105 via network 160. Deduplication engine 110 collects data (e.g., data files and/or data segments to be backed up) and other information from deduplication clients such as deduplication client 180. In the typical case, the deduplication clients break down the data to be backed up into data segments, and make at least a local determination at to the existence of duplicate data segments. In so doing, the data segments thus analyzed can be considered unique with regard to the data subject to the given backup operation (and/or local to the given deduplication client), thereby minimizing the amount of data (e.g., number of data segments) needing to be communicated to deduplication server 105 (e.g., deduplication engine 110). Having received such locally-unique data segments, deduplication engine 110 can then perform further deduplication operations, based on the data segments stored at deduplication server 105 (e.g., in containers 150(1)-(N)). Alternatively, the deduplication clients can be designed to query deduplication engine 110 with respect to locally-unique data segments (e.g., using fingerprint information) in order to make a determination as to the global uniqueness of those data segments.

In addition to managing the data stored in containers 150(1)-(N) and providing the deduplication clients with information regarding data segments, deduplication engine 110 will typically be responsible for determining when to perform a compaction operation on a given container (e.g., one of containers 150(1)-(N), via compaction analysis module 120 (although in the alternative, such functionality can be directly integrated into deduplication engine 110). Examples of scenarios in which a compaction operation may be needed include, for example, situations in which a container is full, a backup image or a certain number of backup images have expired, or the reference lists for some predetermined number of data segments become empty.

Once it is determined that one of containers 150(1)-(N) needs to be compacted, compaction analysis module 120 initiates a compaction operation for the container in question. As noted, such compaction operation is performed to consolidate the storage space occupied by active (e.g., non-expired) data segments at the beginning of a container, and to consolidate the storage space occupied by deleted data segments the end of the container (along with, potentially, any other unused storage space within the container). Such consolidation can be performed by moving the data segments in question (i.e., the actual reading and writing of the data blocks which make up the affected data segments, either within the given container, or by copying to another (i.e., "spare") container), or logically, by manipulating the address information of those data blocks (e.g., the data blocks' address information, stored in an inode or other structure corresponding to the container, for example). As described herein, embodiments employing the conceptual approach of manipulating data block address information use what is generally referred to herein as "inode manipulation." As will be appreciated in light of the present disclosure, while the descriptions herein are presented in terms of a data segment being a single data block, the data segments described herein could easily span (and so include) a number of data blocks.

In one embodiment employing such inode manipulation, a compaction operation begins by accessing a structure in which data block address information is stored (e.g., an inode structure, such as inode 130), which identifies, for example, the physical addresses of data blocks within a container (though, as will be appreciated, other structures may be more appropriate to manipulate, in a given operating system, file system, etc. (e.g., a vnode)). As will be appreciated in light of the present disclosure, such data block address information can be made available to compaction analysis module 120 (e.g., by way of functions provided by kernel 125 that provide for reading/writing data block address information from/to inode 130). Alternatively, such data block address information can be manipulated "in place" (e.g., the actual address information in inode 130 manipulated therein, with the operating system providing support (functions) for performing such operations). In so doing, the address of a given data block within a (deleted) data segment is manipulated in order to "move" the data block (and so, its respective data segment) to the end of the given container data file. Conversely, the data block addresses of data blocks of the active data segments in a container can be manipulated to "move" the active data segments to the beginning of the container data file.

Further, if the state of a given container warrants, compaction analysis module 120 can defragment the container to minimize or eliminate fragmentation caused by such inode manipulation. While such defragmentation can be accomplished by reading and writing the container's active data segments to move data segments within the container, it is typically preferable simply to copy the then-active data segments to a spare container. In this case, the active data segments within a container are read from that container, and written to the beginning of another container (e.g., a spare container that is empty and unfragmented). The empty space at the end of the spare container then becomes the (contiguous) empty space for the storage of new data segments. The original container can then be defragmented, and designated as available for future use as a spare container.

As with computing systems generally, kernel 125 is central to the operation of deduplication server 105. In addition to its other, more pedestrian duties, kernel 125 is designed to support deduplication operations performed by deduplication server 105. As noted, deduplication engine 110 includes compaction analysis module 120, and kernel 125 is designed to support compaction analysis module 120 by providing, for example, functions (and corresponding commands) that support the inode manipulation operations noted earlier, such as reading/writing entire inode structures or portion thereof, changing the position of a data block within a file (e.g., a container data file) by manipulating the data block's address in the file's inode data structure, and/or other such operations.

As will be appreciated, inode 130 is a structure that stores the data block addresses of a given file's data blocks (e.g., the physical addresses of the file's the data blocks within the storage device, in which the given file is stored). Generally, a file's inode (e.g., inode 130) is identified using a file descriptor, which identifies the file's entry in a file descriptor table. The file descriptor table entry thus identified includes a pointer to the file's inode. Once the file's inode is identified, the data block address of a given data block within the file can be determined by accessing the desired data block address using the data block's block number within the inode (e.g., to find the data block address of the file's $4^{th}$ data block, one reads the data block address of block number 4 in the inode (i.e., in the $4^{th}$ data block address location in the inode)). Thus, the location of the address information within inode 130 establishes a mapping between the location of a given data block within a file (and so, all or a portion of a data segment within a container data file), and the data block address of the data block (within the storage device) in which some or all of the data segment's data is stored (thus establishing the location of the actual data stored therein). Thus, the information contained in the contents and structure of a construct such as inode 130 is referred to herein, in general terms, as mapping information. In providing access to such mapping information (e.g., inode 130), kernel 125 allows this address information to be manipulated by compaction analysis module 120, in order for compaction analysis module 120 to recycle storage space within a container.

Data store 140 includes one or more containers (depicted in FIG. 1 as containers 150(1)-(N)), which, in turn, store (deduplicated) data segments received from deduplication clients such as deduplication client 180. Information stored in containers 150(1)-(N) (and so, data store 140) can include, for example, a variety of data and metadata, such as the data of the container's data segments (also referred to herein as "data segment contents"), fingerprint values for those data segments, indexing information, and the like. A container is a logical construct (e.g., a data object) that is made up, for example, of an index file (referred to herein as a container index file) and a data file (referred to herein as container data file). The container index file includes information (e.g., metadata) that describes the data stored in the container data file, and can include, for example, segment information such as a fingerprint value, size, and location of data segments within the container data file, as well as other information (reference lists for the data segments, date information (e.g., for determining expiration), source, and other such information). The container data file includes the actual data segment contents. Similarly, as will be appreciated in light of the present disclosure, data store 140 can further include metadata such as container file names, indexing information and the like.

During a backup operation performed by deduplication client 180, files are identified for backup. These files are then broken up into data segments, and certain of the data segments thus generated (i.e., those that are unique) are identified for backup. These unique data segments are then conveyed to deduplication server 105 (and so, deduplication engine 110), and stored in one of containers 150(1)-(N). As noted, the data segments thus conveyed are stored in a contiguous manner in order to retain data segment locality (e.g., locating data segments corresponding to the same source and/or received at the same time into the same container or set of containers), thereby providing benefits such as those noted earlier (e.g., high performance backup and restore operations). If a given container's capacity has been reached, any remaining data segments are stored in the next container.

Conversely, one or more data segments stored in containers 150(1)-(N) can and will need to be deleted over time. Data segments within a container may need to be deleted, for example, whenever a backup image expires and the expiration leads to some data segments' reference lists becoming empty. In the manner noted, the storage space occupied by such deleted data segments then becomes an unused hole within the container, thus fragmenting the contiguous regions of the container's storage space. A compaction operation can then be performed on such a container in order to recycle the empty space within a container.

Network 160 facilitates communications or data transfers occurring between deduplication server 105 and client 170. Although not shown, network 160 can also facilitate communications or data transfers between deduplication server 105 and any number of clients. Any accepted protocols and physical infrastructure can be used to implement network 160. Similarly, client 170 can be any type of computing device. Examples of client 170 can include a laptop, desktop computer, server, wireless device, and so on. Further, in light of the present disclosure, it will be appreciated that all (or only some) of the data produced by client 170 is backed up by deduplication server 105.

Application 175 is intended to serve as an example of any type of application program executable by client 170. Examples of such applications include document creation and editing programs, internet connection programs, computer maintenance programs, and so on. When executing, application 175 performs read and write operations on data files within file system 190. Such data files and applications can therefore be the subject(s) of the backup operations described herein. Similarly, and as also noted, deduplication client 180 communicates data and other information to deduplication server 105 for processing and storage. For example, deduplication client 180 can collect data to be backed up, as well as related information, and forward this data and information to deduplication server 105. Deduplication client 180 can also remove duplicate copies of data before transmitting such data to deduplication server 105.

As with computing systems generally, operating system 185 provides the functionality to execute, manage and support applications (e.g., application 175), utility programs (e.g., deduplication client 180) and other such programs as may be executed by client 170, as well as any data accessed, managed, etc., thereby. Operating system 185, as shown, includes file system 190. File system 190 allows programs and data to be organized into files and folders. Typically, application 175 views data as files and folders within file system 190. For example, application 175 can view a list of folders displayed as part of file system 190, select a folder, view individual files within that folder, and select one or more such files for viewing, editing, and/or other such operations. File system 190 can use one of several possible file system formats for organizing data into files and folders. Examples of file system formats include File Allocation Table (FAT), New Technology File System (NTFS), Veritas File System® (VxFS®), Third Extended File System (ext3), and so on.

Figure 2:
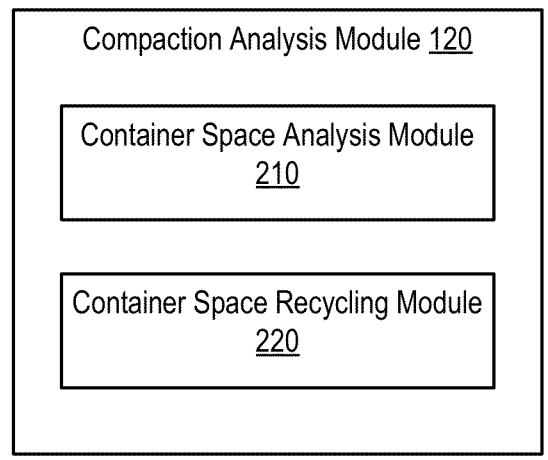
FIG. 2 illustrates an architecture of a compaction analysis module for performing storage space recycling, according to one embodiment of the present invention.

FIG. 2 illustrates an example architecture of a compaction analysis module, such as might be used to construct compaction analysis module 120 of FIG. 1. In the manner noted, compaction analysis module 120 provides the requisite functionality to support storage space recycling. As depicted in FIG. 2, compaction analysis module 120 includes, for example, a container space analysis module 210 and a container space recycling module 220.

Although such determinations can be made in a separate module within deduplication engine 110, as depicted in FIG. 2, container space analysis module 210 provides the requisite functionality to determine the need to perform a compaction operation on a container. Whether the need for a container's compaction is determined in deduplication engine 110 or by container space analysis module 210, such determination can rest upon a number of factors, such as, for example, the detection of the expiration of a backup image or reaching a predetermined number of empty data segment reference lists within a container's container index file. Container analysis module 210 also receives information describing the data segments to be deleted as part of a compaction operation. In response, container space analysis module 210 calls container space recycling module 220 to perform a compaction operation on the container. If appropriate to the compaction/defragmentation operation to be performed, the addressing information can be read from the appropriate inode's structure, prior to initiating a compaction operation employing inode manipulation. Further, the address information can be copied to a temporary data structure, as a failsafe, in case errors are encountered during the inode manipulation operation. A compaction operation is then be initiated by identifying or retrieving data segment information and inode information corresponding to the given container data file.

Once a container has been identified for compaction, container space recycling module 220 is called to recycle the storage space of the container (e.g., by manipulating the address information stored in the container data file's inode). As noted herein, data segments within a container can be consolidated by manipulating the data block address information in the container data file's inode, such that the data block addresses stored at each of the inode's block numbers are rearranged to locate the container's deleted data segments at the end of the container's container data file, and so, the container's active data segments at the beginning of the container's container data file. In so doing, the affected data block addresses stored in the inode are moved from one location (as identified by the data block's original block number in the container data file's inode) to the requisite location (as identified by a new block number in the inode).

Once container space recycling module 220 has successfully compacted the given container's container data file by performing the aforementioned inode manipulation, container space recycling module 220 can then update the affected metadata in the container's container index file to reflect the new arrangement of data segments within the container's container data file. As noted earlier, the movement of data block addresses can be effected in a number of ways, such as by copying the address information from the inode's kernel data structure (i.e., in the kernel space) into a data structure (i.e., in the user space), or by performing the manipulation "in place" (e.g., by accessing inode's kernel data structure directly). As will be appreciated, container space recycling module 220 can also recycle space in a container by using a spare container to copy data segments to the beginning of the spare container, utilizing the spare container to store new data segments, and recycling the old container as a spare container in the future (subject to any defragmentation that might be needed).

Figure 3A:
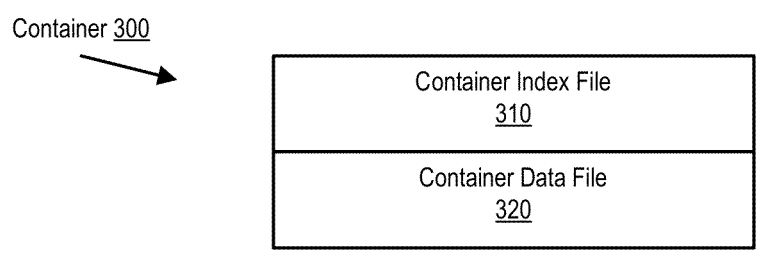
FIG. 3A illustrates a container, according to one embodiment of the present invention.

FIG. 3A is a block diagram illustrating an example of a storage object (depicted in FIG. 3A as a container 300). In the manner discussed previously, container 300 includes a container index file 310 and container data file 320, as well as information regarding these files (not shown). Container index file 310, also referred to herein as container metadata, includes information that describes the data in container data file 320. Container metadata can include segment information such as a fingerprint value, size, and location, as well as other information (reference lists for the data segments, date information (e.g., for determining expiration), source, and other such information). Container data file 320 includes the actual data segment contents.

Figure 3B:
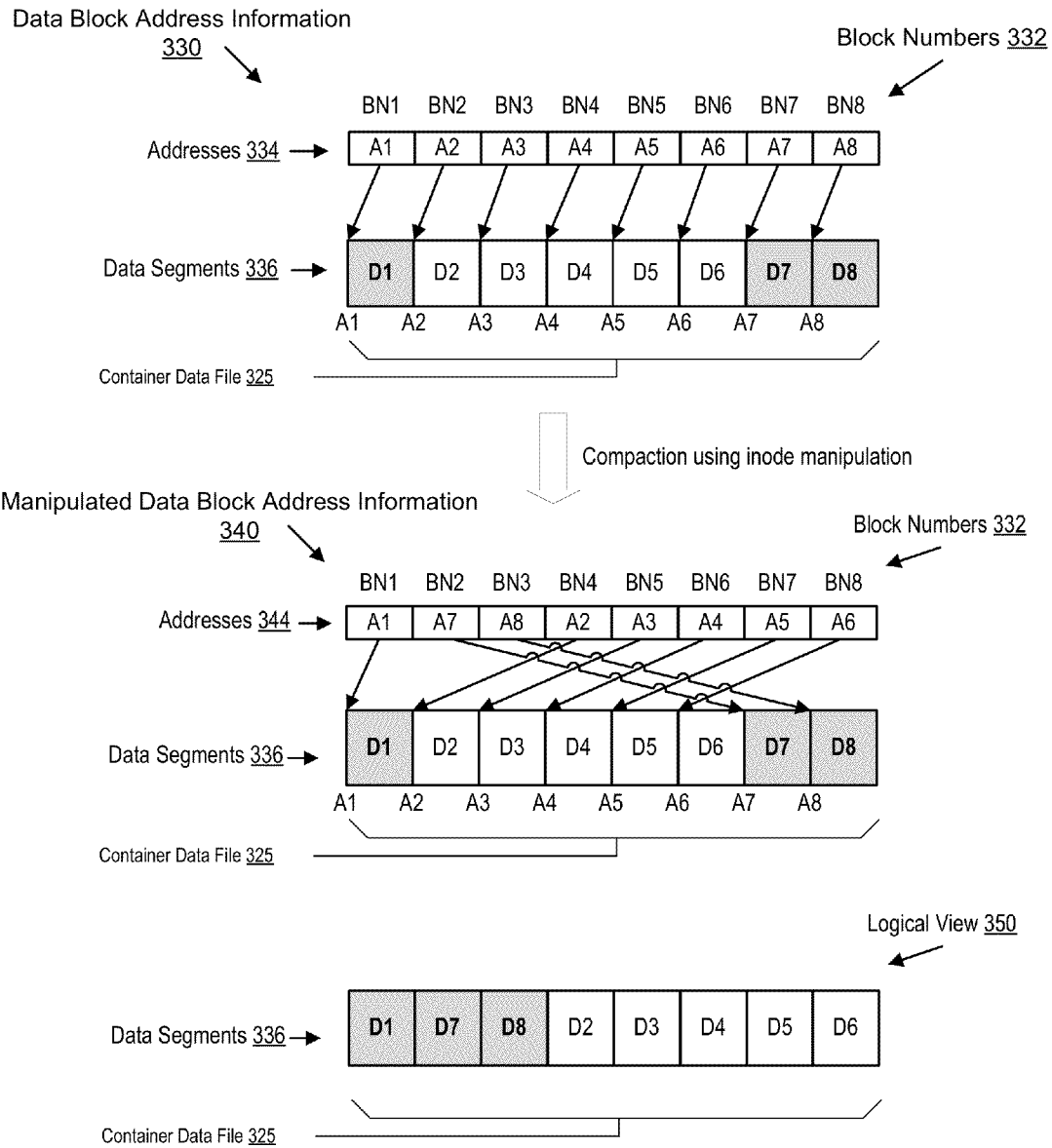
FIG. 3B illustrates an example of inode manipulations, according to one embodiment of the present invention.

FIG. 3B illustrates an example of inode manipulations that can be performed to effect compaction of a container data file 325. As an initial point, it will be noted that the following discussions apply with equal force to scenarios in which an inode's data block address information is read out from the inode's kernel space data structure into a user space data structure, manipulated, and then written back into the inode's kernel space data structure, or simply manipulated "in place" within the inode's kernel space data structure. In the example depicted in FIG. 3B, the inode's address information is depicted as data block address information 330, which includes a number of data block addresses (depicted as addresses 334) addressed by a number of block numbers corresponding thereto (depicted as block numbers 332). As is also depicted in FIG. 3B, the addresses stored in data block address information 330 (addresses 334 of data block address information 330) are those of the data blocks that make up the data segments stored in container data file 325, which appear in FIG. 3B as data segments D1-D8, and such as might be found within container data file 320 of FIG. 3A. As will be appreciated in light of the present disclosure (and as noted earlier), while each of data segments D1-D8 is shown as being stored in a corresponding data block (based on the addressing depicted), the data of such data segments can, in fact, be stored in a single data block (e.g., a 1:1 correspondence), or in multiple data blocks (e.g., a 1:N correspondence).

As shown, the data blocks of data segments D1-D8 are located at data block addresses corresponding to data block addresses A1-A8. Data block addresses A1-A8 are, in turn, stored in the container data file's inode structure (and copy thereof), and can be, for example, addressed therein by block numbers BN1-BN8, respectively. A block number is used to identify the location of a data block address within an inode, and so identifies the location of a given data block within a file (in this case, the location of the data segment, corresponding to the data block, within its container data file). Accessing the data blocks of a given file in block-number sequence produces the data block addresses of those data blocks in the sequence in which the data block addresses are stored in the inode (i.e., in the example depicted in FIG. 3B, addresses A1-A8, sequentially). Given this sequence, a data block can be moved within a file by moving its data block address from one location in an inode's data structure (as identified by the location's block number) to another location therein (again, as identified by the new location's block number), and in so doing, effect the apparent movement of the data segment (or portion thereof) corresponding thereto, within its container data file.

Data segments D1, D7, and D8 are shaded to illustrate that these data segments are active data segments. Conversely, data segments D2-D6 are not shaded to indicate that these data segments are deleted data segments (although it will be appreciated that a container data file might just as easily include one or more unused data segments, as well).

Manipulated data block address information 340 illustrates the results of performing a compaction operation on container 300 of FIG. 3A by inode manipulation. As noted, inode manipulation such as that described herein moves data block addresses from one location in an inode's data structure to another, in order to effect such compaction. This results in the location of the data block addresses of the data segments' data blocks (and so the data segments) being moved within the container data file. Thus, by moving deleted data segments' data block addresses to locations with higher block numbers in the container data file's inode (i.e., to the end of the container data file), the container data file can be compacted. Conversely, the active data segments' data block addresses can be moved to the beginning of the container data file's inode by reassigning the active data segments' data block addresses to locations with lower block numbers.

Manipulated data block address information 340 includes block numbers 332, as before, as well as addresses 344 (the addresses of data block addresses A1-A8, in their rearranged locations). Manipulated data block address information 340 corresponds to data segments 336 (in the manner described earlier), in which each data segment is stored in a corresponding data block. As shown, the data block addresses of active data segments D1, D7, and D8 (corresponding to addresses A1, A7, and A8) have now been moved to the locations identified by block numbers BN1-BN3, which correspond to the first three data blocks of the container. Conversely, deleted data segments D2-D6 (with their data blocks having corresponding data block addresses A2-A6) have now been moved to the locations identified by block numbers BN4-BN8, which correspond to data blocks at the end of the container. By doing so, the empty storage space previously taken by data segments D2-D6 can be effectively "moved" to the end of the container to become contiguous empty space, and so available for the storage of new data segments. This logical reordering (or more simply, reordering) is illustrated by logical view 350, which depicts the logical ordering of data segments when their respective data is accessed sequentially by their newly-respective block numbers.

Figure 4A:
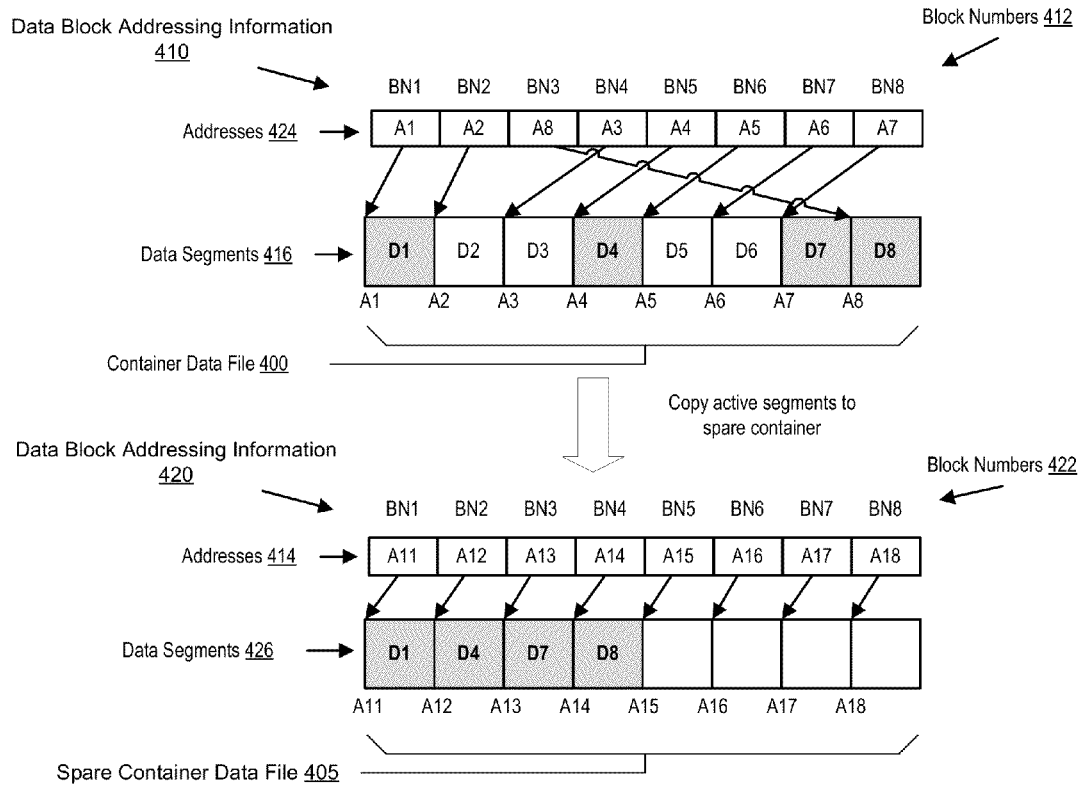
FIG. 4A illustrates an example use of a spare container to perform storage space recycling, according to one embodiment of the present invention.

FIG. 4A illustrates the compaction of a container (the container data file of which is depicted in FIG. 4A as a container data file 400) using a spare container to perform storage space recycling (the spare container data file of which is depicted in FIG. 4A as a spare container data file 405). FIG. 4A illustrates data block addressing information 410, which includes addresses 414. Addresses 414 are themselves addressed by block numbers 412, in the manner described earlier. Also as before, addresses 414 are data blocks addresses of the data blocks to which data segments 416 correspond, respectively. Data block addressing information 410, as shown, allows data segments D1-D7 to be addressed using corresponding ones of data block addresses A1-A8, which are identified by block numbers BN1-BN8, respectively. As shown, data segments D1, D8, D4, and D7 are shaded and thus indicate active data segments, while data segments D2, D3, D5, and D6 are not shaded, thus indicating deleted data segments. For purposes of the present discussion, it is assumed that the addressing that is illustrated has resulted from earlier inode manipulation and/or actual data movement, and that, given this situation, performing a compaction operation on the corresponding container by manipulating data block addressing information 410 in this scenario is not desirable. For example, such might be the case if inode manipulation would result in an unacceptable level of address fragmentation, or would not produce sufficient contiguous empty space at the end of the container. As noted, the former situation can occur, for example, when attempting to move active and deleted data segments in a manner that would cause an unacceptable level of indirection in data block address storage and access.

In such cases, an (empty) spare container is employed (represented in FIG. 4A by spare container data file 405). The data blocks that make up the data segments of spare container data file 405 (depicted in FIG. 4A as data segments 426) are accessed in the manner described previously, and thus, the various elements of its data block addressing are shown merely to illustrate the effect moving the active data segments from container data file 400 to spare container data file 405 has on data block addressing. That being said, the data blocks of spare container data file 405 (and so data segments 426) are located at the addresses 414, which are stored in the inode of spare container data file 405 at block numbers BN1-BN6 (collectively identified in FIG. 4A as block numbers 422).

Using a spare container, compaction is performed by copying the active data segments within data segments 416 to those of data segments 426 at the beginning of the spare container. In the scenario illustrated in FIG. 4A, the data blocks of data segments D1, D4, D7 and D8 are copied from addresses A1, A4, A7 and A8 of addresses 424, to addresses A11, A12, A13 and A14 of addresses 426. The spare container's remaining storage space (in the example, corresponding to block numbers BN5-BN8) remains empty, and thus ready for use in storing new data segments in a contiguous manner. As will be appreciated, moving the active data segments (data segments D1, D4, D7 and D8) from container data file 400 to spare container data file 405 results in simplified addressing of, and thus, improved efficiency in accessing those data segments.

Figure 4B:
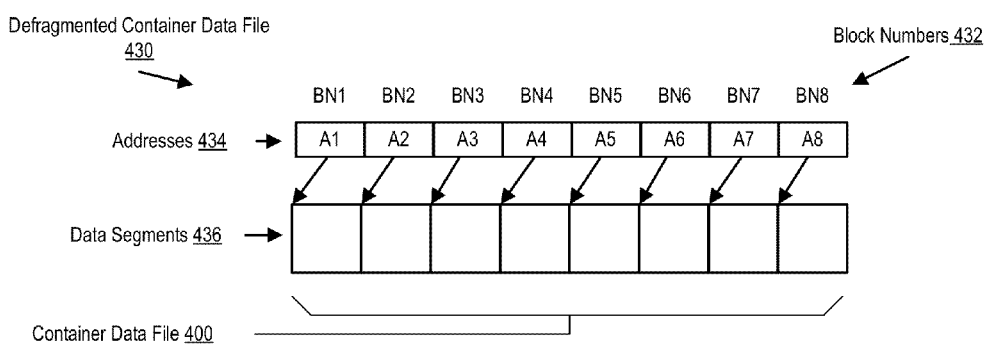
FIG. 4B illustrates an example defragmentation of a container, according to one embodiment of the present invention.

FIG. 4B illustrates an example of a defragmented container data file 430, which is the result of having defragmented container data file 405 after the copying depicted in FIG. 4A has successfully completed. Thus, defragmented container data file 430 corresponds to the previously-used data block addressing information (e.g., data block addressing information 410 of FIG. 4A) after a defragmentation operation has been performed. A defragmentation operation is performed to address fragmentation of the container by organizing the container's contents in a sequentially-addressed, contiguous fashion, as well as to remove any addressing inconsistencies within the container. Defragmented container data file 430 includes addresses 434, which are referenced by block numbers 432. As shown, defragmented container data file 430 now reflects that the addresses stored at block numbers BN1-BN8 correspond with addresses A1-A8, which allows such a container to be used as a spare container in the future, given that no fragmentation or addressing inconsistencies exist within the container.

Figure 5:
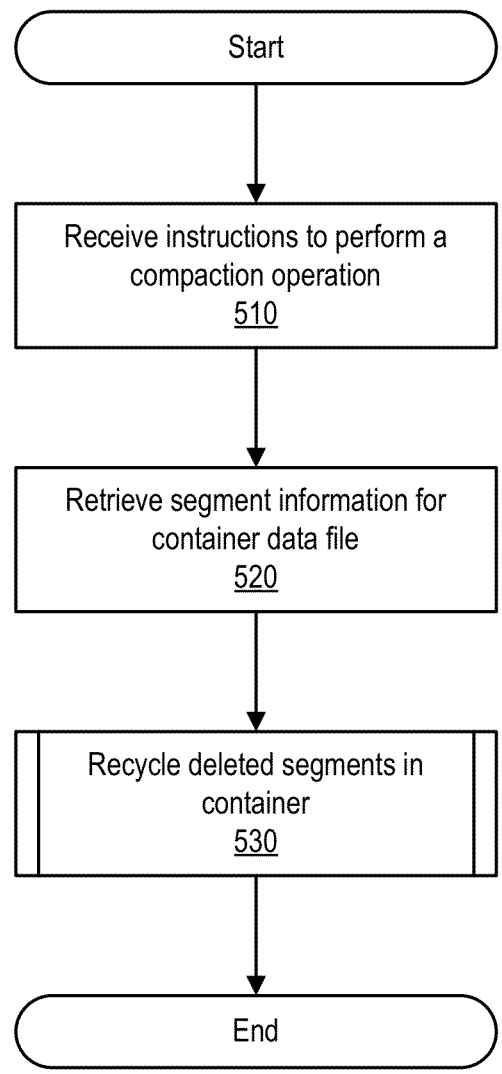
FIG. 5 is a flowchart illustrating an example of a process for performing a compaction operation, according to one embodiment of the present invention.

FIG. 5 is a flowchart illustrating an example of a process for performing a compaction operation, as performed by a compaction analysis module (e.g., such as compaction analysis module 120 of FIG. 2). The process of FIG. 5 begins at 510, where the compaction analysis module makes a determination that a container is in such a state that a compaction operation needs to be performed (or receives instructions to this effect from the deduplication engine). At 520, the compaction analysis module retrieves data segment information for the container's container data file from the container's container index file. It will be appreciated, however, that data segment information can be retrieved from a number of different sources. These sources can include the container itself, the disk array, the file system, or other local storage.

Once the requisite data has been retrieved, the process continues to 530. At 530, the compaction analysis module recycles the container's deleted data segments. As noted earlier, such deleted data segments can arise due to expired backup images, for example, and can result in holes within the container. In order to reuse the storage space freed by such deletions, the holes within a container are recycled. Holes within a container can be recycled by moving the storage space corresponding to the deleted data segments to the end of a container to become continuous storage space at the end of the container. Once moved, this storage space can then be reused for the contiguous storage of new data segments. Further details as to the manner in which storage space can be recycled is described in connection with FIGS. 6A, 6B, 7A, and 7B. Once deleted data segments in a container are recycled, the process is complete.

Figure 6A:
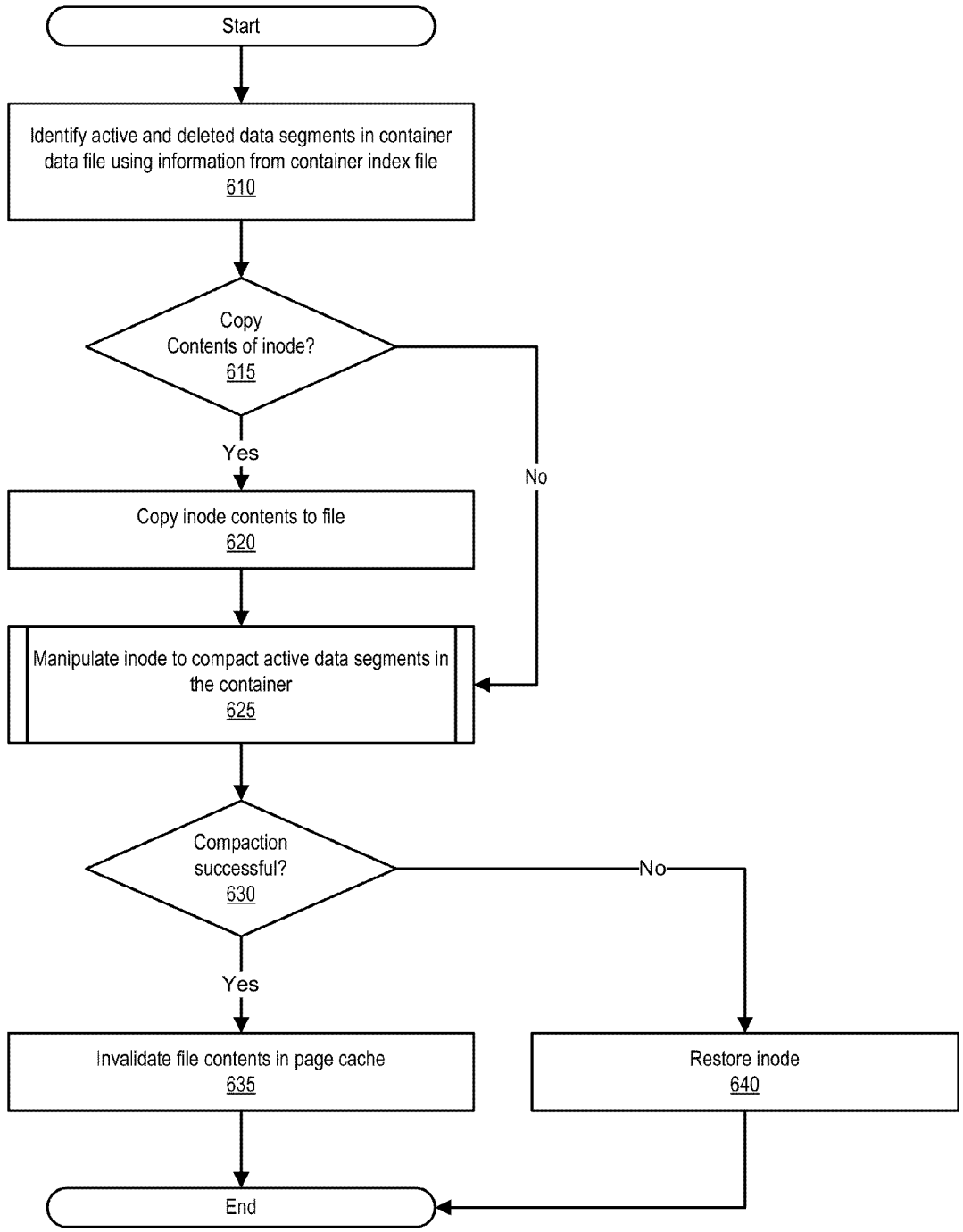
FIG. 6A is a flowchart illustrating an example of a process for performing storage space recycling, according to one embodiment of the present invention.

FIG. 6A is a flowchart illustrating an example of a process for performing storage space recycling, as performed by a compaction analysis module (e.g., such as compaction analysis module 120 of FIG. 2). The process begins at 610, where the compaction analysis module identifies the active and deleted data segments within a container data file using information from the container index file. The data blocks of the active and deleted data segments can be identified by identifying the location and size of the active and deleted data segments within a container.

The process continues at 615, where a determination is made as to whether a copy of the contents of the container data file's inode (i.e., data block addresses stored in the inode) is to be made. A copy of the inode's contents can be made as a fail-safe copy in case the inode manipulation process results in an error (e.g., inode corruption). In such cases, the fail-safe copy of the inode contents can be retrieved to restore the inode. If a fail-safe copy of the inode's contents is to be made, the process continues at 620, where the a copy of the inode's contents is made (e.g., by copying the data block addresses to a file). Once complete, the process continues to 625. In cases where a copy of the inode's contents is not to be made, the process also continues directly to 625. Such might be the case, for example, in a scenario in which data block address information was to be manipulated "in place," and the kernel cannot or will not provide a spare inode for this purpose (e.g., due to there being no free inodes available from the kernel's inode pool, or because the kernel does not support such functionality). At 625, the compaction analysis module performs inode manipulation by rearranging the data block addresses from the inode. By rearranging the data block addresses of the container data file's data segments, the container data file's active data segments are compacted within the container. Details of the manner in which the inode manipulation can be performed are described in connection with FIGS. 6B and 7A.

The process then continues to 630, where a determination is made as to whether the compaction operation was successful. If the compaction operation was successful, the process continues to 635. At 635, the compaction analysis module invalidates any pages containing contents of the container data file, which may be in the page cache (alternatively, the entire cache can be flushed). Such file contents in the page cache are invalidated after a compaction operation is complete in order to prevent applications from attempt to access stale data and/or using stale addressing information. As an example, a page cache may reflect the ordering of data segments within a container as the ordering existed prior to moving such segments via inode manipulations, which is no longer the correct ordering. The process then ends.

Alternatively, if the compaction operation was not successful, the process continues to 640. At 640, the compaction analysis module restores the inode by retrieving the copy of the inode and copying such contents to the inode. At this point, the process ends.

Figure 6B:
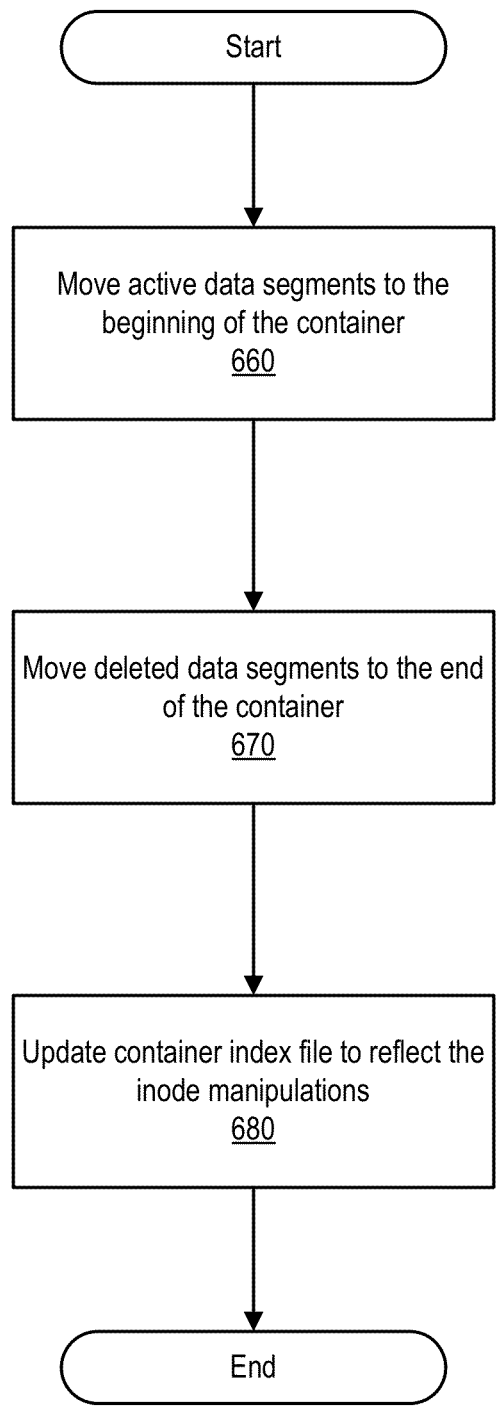
FIG. 6B is a flowchart illustrating an example of a process for moving data blocks of a container data file's data segments by manipulating an inode, according to one embodiment of the present invention.

FIG. 6B is a flowchart illustrating an example of a process for moving the data blocks of a container data file's data segments by manipulating the data block addresses stored in the container's data file's inode. The process of FIG. 6B illustrates the details of 625, as shown in FIG. 6A. The process of FIG. 6B is performed by a compaction analysis module (e.g., such as the compaction analysis module 120 of FIG. 2).

The process begins at 660, where the container space recycling module of a compaction analysis module moves active data segments to the beginning of a container. Active data segments can be moved to the beginning of a container by moving the data block addresses of the active data segments' data blocks towards available locations at the beginning of the container data file's inode data structure (i.e., moving the given data block addresses toward lower block numbers). Once the active data segments have been identified (either by the container space analysis module of the compaction analysis module, or elsewhere in the deduplication engine), the compaction analysis module can determine the number of active data segments that exist in the container, as well as the size associated with each group of active data segments. At 660, the data block address(es) of data block(s) of the first active data segment are stored in the first available data block address location. Each subsequent active data segment is moved by causing that data segment's data block address(es) to be stored in the next data block address location.

The process then continues at 670. At 670, the compaction analysis module moves the deleted data segments to the end of the container. Deleted data segments can be moved to the end of the container by moving the data block addresses of the deleted data segments' data blocks towards the end of the end of the container data file's inode data structure (i.e., moving the given data block addresses toward higher block numbers). When deleted data segments are identified, the number of deleted data segments is identified. At 670, the data block address(es) of data block(s) of the first deleted data segment are stored in the last available data block address location that is adjacent to, but after, that of the data blocks of the last active data segment. Each subsequent deleted data segment is moved to the end of the inode's data structure by causing that data segment's data block address(es) to be stored in the next data block address location.

By performing inode manipulation, the compaction analysis module is able to rearrange data segments within a container, such that the compaction analysis module is able to create a contiguous region of unused storage space at the end of the container. This empty contiguous space can then be used for storing new data segments. In the event that the new data segments take up more space than the empty space available in a container, the remaining new data segments can be placed within the next container with sufficient available storage space. This can be repeated until all new data segments have been stored. The location of the new data segments within one or more containers is then stored and tracked by the corresponding container index files.

After moving the deleted data segments, the process continues to 680. At 680, the compaction analysis module updates the container index file to reflect the operations performed at 660 and 670, and resulting new sequence of data segments within the container data file. The container index file can be updated to reflect the new locations of the active and deleted data segments within the container. Once complete, the process ends.

Figure 7A:
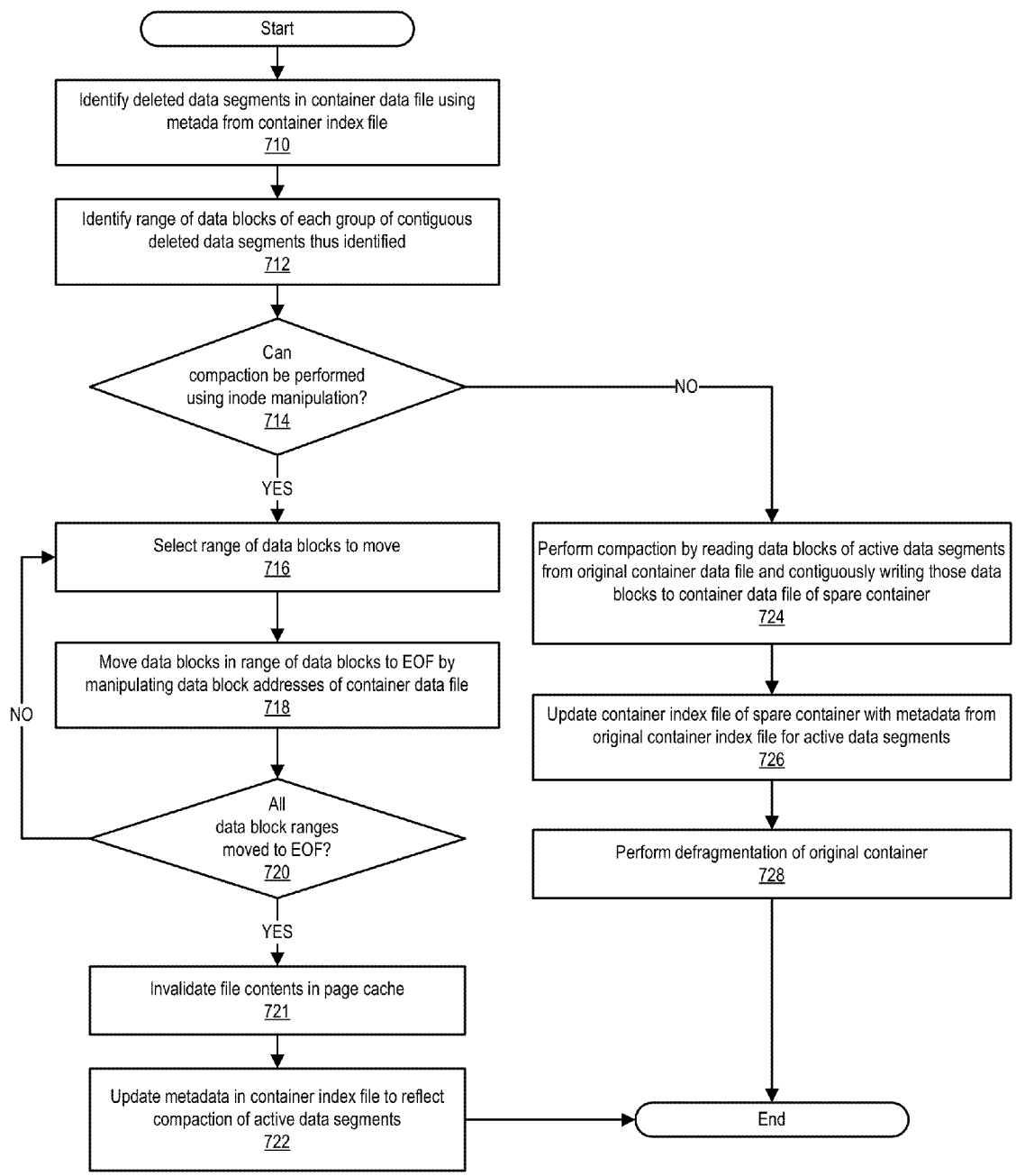
FIG. 7A illustrates another example of a process for performing storage space recycling, according to one embodiment of the present invention.

FIG. 7A illustrates an example of a process for performing storage space recycling that checks for container fragmentation, as performed by a compaction analysis module (e.g., such as compaction analysis module 120 of FIG. 2). The process of FIG. 7A begins at 710, where the compaction analysis module identifies the deleted data segments in a container by using the metadata within the container index file. The process then continues at 712, where the compaction analysis module identifies the range of data blocks of each group of contiguous deleted data segments identified at 710.

At 714, the compaction analysis module determines whether compaction can be performed using inode manipulation. If compaction can be performed using inode manipulation, the process continues at 716. At 716, the process selects the first (or next) range of data blocks, out of the one or more ranges of data blocks to be moved, which is to be moved to the end of the container data file by identifying the data blocks therein. The data blocks in the selected data block range are then moved to the end of the file at 718 by manipulating data block addresses of the affected data blocks. A determination is then made at 720 as to whether all data blocks of the data block ranges have been moved to the end of the file. If data block ranges remain to be moved to the end of the file, the process loops back to 716, where the next data block range is selected. Otherwise, if all data blocks in the data block ranges have been moved to the end of the file, the compaction analysis module invalidates any pages containing contents of the container data file that may be in the page cache and updates the metadata in the container index file to reflect compaction of the active data segments into the beginning of the container data file, as shown in 721 and 722. In so doing, the container data file's deleted data segments are moved to the end of the container data file by moving data block addressed in the container data file's inode data structure (or a copy thereof, in the user space, if the data block addresses have been read out of the inode's kernel space data structure). At this point, the process ends.

Alternatively, in situations in which compaction cannot be performed using inode manipulations, as determined at 714, the process continues to 724. At 724, the compaction analysis module performs compaction by reading the data blocks of active data segments from the original container data file and contiguously writing those data blocks to a container data file of a spare container. Once complete, the container index file of the spare container is updated with metadata from the original container index file for the active data segments, as shown at 726. The process continues at 728 where defragmentation is performed on the original container. At this point, the process then ends.

The following illustrates an example of pseudocode for implementing the process of FIG. 7A.

```
struct hole_vector {
        off_t offset;              # start offset of deleted segment (in disk_block_size)
        size_t count;              # byte count of the deleted segment space (in
        disk_block_size)

}
int sys_del_compaction(
                                   /* RETURN VALUE
                                   /* 0 - specified byte range "swapped" to EOF
                                   /* 1 - no swapping" performed
        int fd,                    # file descriptor of a container file
        struct hole_vector* hole,  # array (offset, count) represents deleted segments
        size_t n);                 # size of hole array
int check_moving_bytes_EOF_acceptable (int fd, struct hole_vector* hole, size_t n )
int move_bytes_to_EOF (int fd, struct hole_vector* hole)
int sys_del_compaction(int fd, struct hole_vector* hole, size_t n )
/*
/* Check if moving each set of bytes specified by each element of hole
/* (the array of <offset, count>) to end of container
/* will result in the container's data file becoming unacceptably fragmented
/*
/* uses check_moving_bytes_EOF_acceptable( ) (returns 0 if OK, 1 if unacceptable)
/*
{
        if (check_moving_bytes_EOF_acceptable (fd, hole, n) == 0)
        {
                for (i=1; i<n; i++)
                {
                        /* move the series of bytes in the range of
                        /* hole[i].offset to (hole[i].offset + hole[i].count)
                        /* to the EOF of the container's data file
                        move_bytes_to_EOF (fd, hole[i]);
                }
```

```
                return 0;
        }
    else
        {
                return 1;
        }
}
int sys_file_defragment(int fd)             # fd = file descriptor of spare container file
/*
/* defragments space of a file by re-arranging inode disk data blocks
/* forms continuous space without regard for the file content
/* call is used to defragment the spare container
/*
{
            Perform defragmentation operations;
}
int NEW_compact_container (
            int fd,                              # file descriptor of a container file
            struct hole_vector* hole,            # array (offset, count) represents deleted segments
            size_t n);                           # size of hole array
int NEW_Compact_Container (int fd, struct hole_vector* hole, size_t n )
/*
/* Pseudocode implementing overall compaction algorithm
/*
/*      fd      = file descriptor of container file being compacted
/*      hole    = array of segments to be deleted from the container file being compacted
/*      n       = number of elements (segments being deleted) in hole_array
{
            if (sys_del_compaction(fd, hole, n) == 0)       # Try to perf new compaction
                                                              algorithm
                {
                    update_container_index_file (xxxx)      # New compaction algo
                                                              successful,
                                                            # so update container index
                                                              file
                                                            # to reflect the offset changes
                }
            else
                {
                        /* NO compaction was performed. Perform compaction by
                        /* copying active segments to spare container and
                        /* swapping the original container and the spare container
                        /* (assumes, e.g., entries in file descriptor table are swapped,
                        /* such that fd and fd_sparecontainer are swapped upon return)
                        original_compaction (***** fd, fd_sparecontainer *****);
                        /* make the data blocks of the container
                        /* that is now spare container (used to be the original container)
                        /* contiguous for next use
                        sys_file_defragment(fd_sparecontainer);
                }
}
```

Figure 7B:
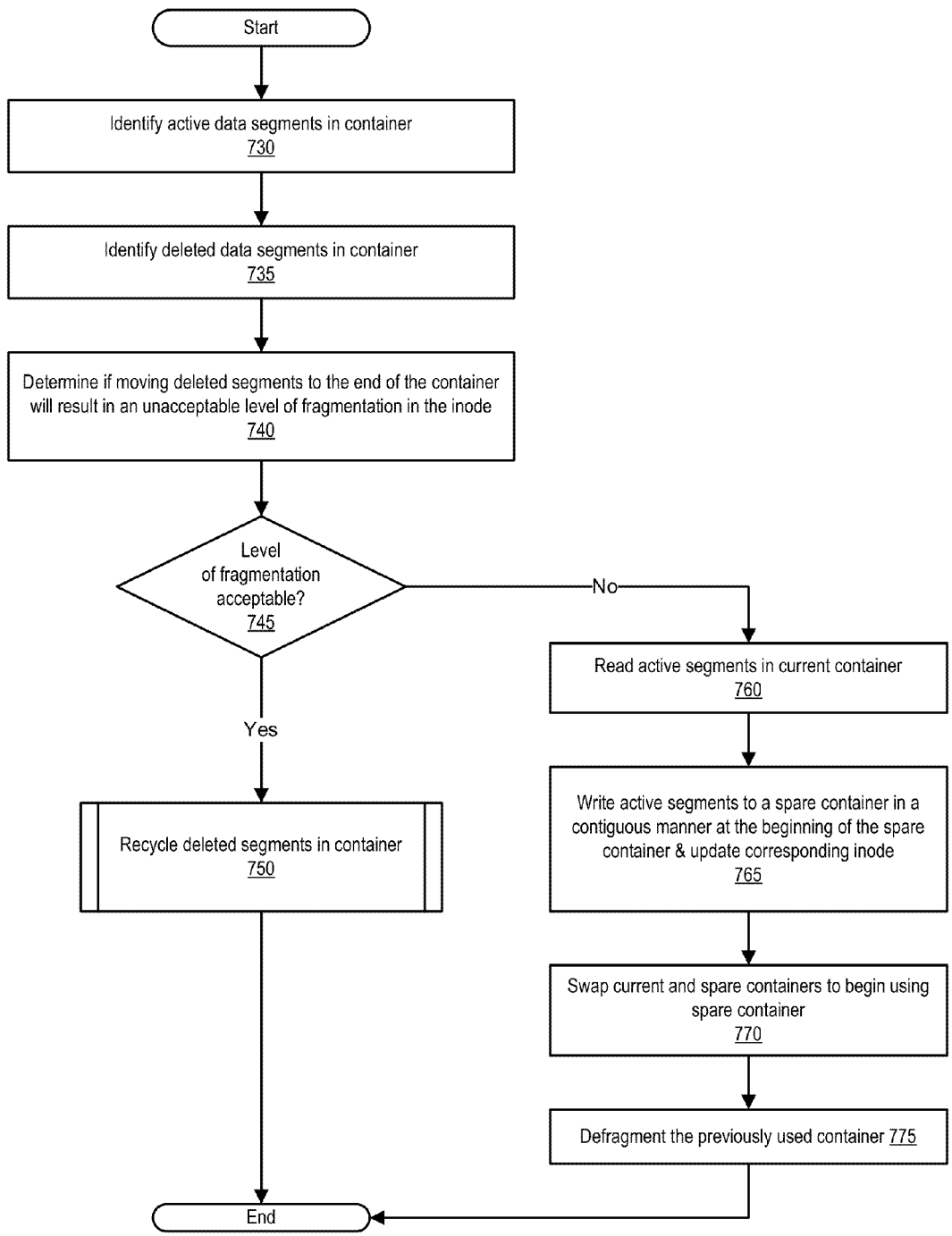
FIG. 7B illustrates another example of a process for performing storage space recycling, according to one embodiment of the present invention.

FIG. 7B illustrates another example of a process for performing storage space recycling that checks for fragmentation, as performed by a compaction analysis module (e.g., compaction analysis module 120 of FIG. 2). The process of FIG. 7B begins at 730, where the compaction analysis module identifies the active data segments within a container, either by referencing an index file, or by some other comparable mechanism. The process then continues to 735, where the compaction analysis module identifies the deleted data segments in a container, by way of the same or similar mechanism. Once both active and deleted data segments have been identified, the process continues to 740.

At 740, the compaction analysis module determines whether moving the deleted data segments to the end of a container will result in an unacceptable level of fragmentation within the inode. This determination is made at 745. Acceptable levels of fragmentation can be set according to configuration settings for the compaction analysis module, which can be based on any number of factors (e.g., container fragmentation, address fragmentation, disk fragmentation and/or other such parameters).

If the compaction analysis module determines at 745 that moving the deleted data segments will result in an acceptable level of fragmentation, the process continues to 750. At 750, the compaction analysis module performs storage space recycling by way of inode manipulation, as discussed in connection with FIG. 6B or 7A.

Alternatively, if the compaction analysis module determines at 745 that moving the deleted data segments will result in an unacceptable level of fragmentation, the process continues to 760. At 760, the compaction analysis module reads the active data segments within the container. At 765, the compaction analysis module writes the active data segments to a spare container in a contiguous manner at the beginning of the spare container. In addition, the inode corresponding to the spare container is also updated to reflect the active data segments being written to the spare container.

The process then continues to 770, where the container and the spare container are "swapped" (e.g., the spare container is designated as being "in service," while the original container is taken out of service (e.g., for defragmentation), after which the original container is returned to service as a spare container). This swapping is performed to begin using the spare container as the current container. The spare container, which stores the active data segments in a contiguous region at the beginning of thereof, has contiguous empty space thereafter, and so enables new data segments to be stored contiguously therein. In addition, the spare container will not include unacceptable levels of fragmentation.

The process then continues to 775, where the previously used container can be defragmented, if need be. This defragmentation removes any addressing inconsistencies, empty references to data segments, and the like. The defragmentation performed at 775 can be performed as a background process, and can be performed at any point in time. At this point, the process ends.

Figure 8:
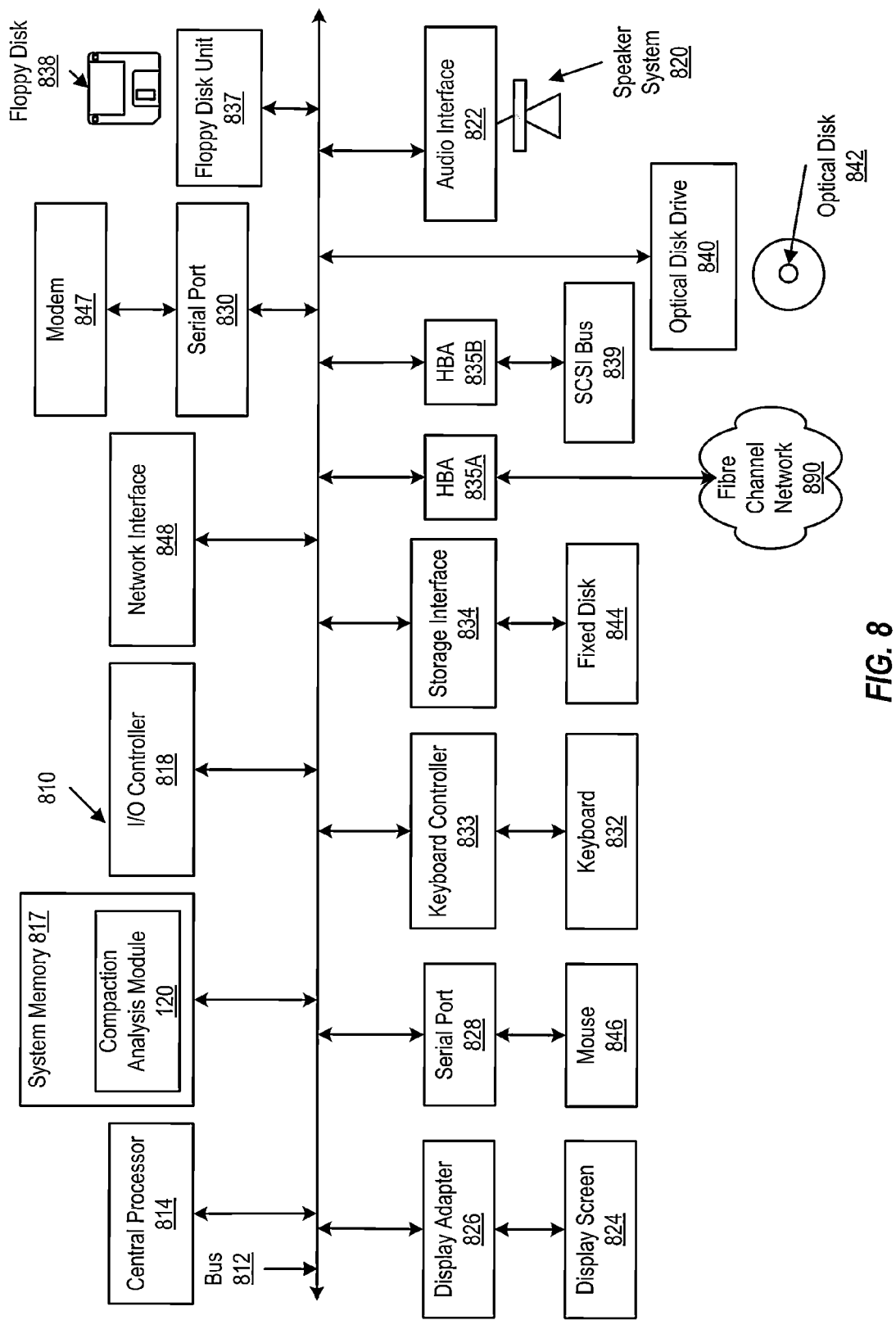
FIG. 8 is a block diagram of a computing system, according to one embodiment of the present invention.

FIG. 8 is a block diagram of a computing system 810 suitable for implementing space recycling, as described above. Computer system 810 includes a bus 812 which interconnects major subsystems of computer system 810, such as a central processor 814, a system memory 817 (typically RAM, but which can also include ROM, flash RAM, or the like, and which can also include software implementing a compaction analysis module 120 like that shown in FIG. 2), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk unit 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer-readable medium, such as a hard disk drive (e.g., fixed disk 844), an optical drive (e.g., optical disk drive 840), a floppy disk unit 837, or other storage medium. Additionally, applications can be in the form of electronic signals modulated in accordance with the application and data communication technology when accessed via modem 847 or network interface 848.

Storage interface 834, as with the other storage interfaces of computer system 810, can connect to a standard computer-readable medium for storage and/or retrieval of information, such as a fixed disk drive 844. Fixed disk drive 844 can be a part of computer system 810 or can be separate and accessed through other interface systems. Modem 847 can provide a direct connection to a remote server via a telephone link or to the Internet via an internet service provider (ISP). Network interface 848 can provide a direct connection to a remote server via a direct network link to the Internet via a POP (point of presence). Network interface 848 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 8 need not be present to practice the present invention. The devices and subsystems can be interconnected in different ways from that shown in FIG. 8. The operation of a computer system is readily known in the art and is not discussed in detail in this application. Code to implement the present invention can be stored in computer-readable storage media such as one or more of system memory 817, fixed disk 844, optical disk 842, or floppy disk 838. The operating system provided on computer system 810 can be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention can include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
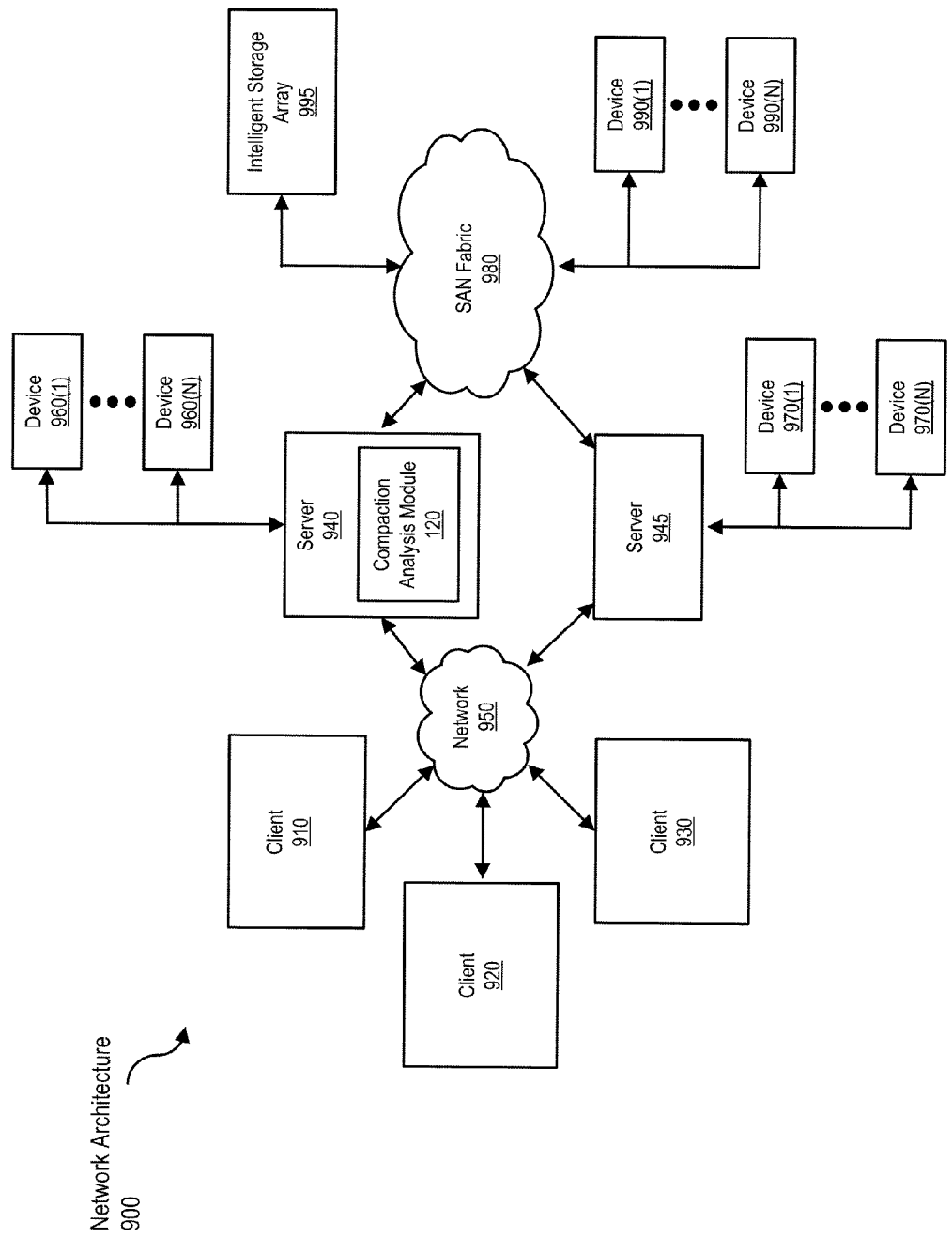
FIG. 9 is a block diagram of a network system, according to one embodiment of the present invention.

FIG. 9 is a block diagram of a network architecture 900 in which client systems 910, 920, and 930 and servers 940 and 945 can be coupled to a network 950. Client systems 910, 920, and 930 generally represent any type or form of computing device or system, such as computing system 810 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 can include a compaction analysis module 120, as shown in FIG. 2.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS). Such storage devices can further be implemented using virtual storage techniques, and thus, as used herein, the concept of a storage device comprehends virtual and/or physical storage devices, as well as combinations thereof.

For example, servers 940 and 945 can also be connected to a storage area network (SAN) fabric 980. SAN fabric 980 generally represents any type or form of computer network or architecture capable of facilitating communication between multiple storage devices (whether virtual or physical). SAN fabric 980 can facilitate communication between servers 940 and 945 and a number of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computing system 810 of FIG. 8, a communication interface can be used to provide connectivity between each client system 910, 920, and 930 and network 950. Client systems 910, 920, and 930 can be able to access information on server 940 or 945 using, for example, a web browser or other client software. Such software can allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in server 940, run by server 945, and distributed to client systems 910, 920, and 930 over network 950.

In some examples, all or a portion of the computing devices in FIGS. 1, 2, 3A, 3B, 4A, 4B, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a compaction analysis module 120 in FIG. 2 can transform the contents of an inode.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    identifying a data segment from a plurality of data segments within a storage object, wherein
        the data segment represents data stored in a storage device,
        at least a portion of the data is stored in a data block associated with the data segment, and
        the plurality of data segments comprises
            active data segments, and
            deleted data segments;
    determining whether compaction of the storage object can be performed using address manipulation on a data block address of the data block; and
    in response to a determination that the compaction of the storage object can be performed using the address manipulation on the data block address of the data block, compacting the storage object, wherein
        the compacting comprises reordering a set of data segments of the plurality of data segments within the storage object,
        the reordering the set of data segments comprises performing the address manipulation on the data block address of the data block,
        the reordering the set of data segments changes an order of the set of data segments within the storage object,
        the reordering results in the active data segments being stored contiguously within the storage object,
        the set of data segments comprises the data segment, and
        the data block address is an address of the data block within the storage device.

2. The method of claim 1, wherein
    the data segment is a deleted data segment,
    the plurality of data segments are in an order within the storage object,
    the data segment is in a first location in the order within the storage object, prior to the reordering,
    the data segment is in a second location in the order within the storage object, subsequent to the reordering, and
    the second location is closer to a first end of the order within the storage object, than is the first location.

3. The method of claim 2, wherein
    another data segment of the set of data segments is an active data segment,
    the another data segment is in a third location in the order within the storage object, prior to the reordering,
    the another data segment is in a fourth location in the order within the storage object, subsequent to the reordering, and
    the fourth location is closer to a second end of the order within the storage object, than is the third location.

4. The method of claim 1, wherein
    the data segment and the data block are associated with one another by mapping information.

5. The method of claim 4, wherein
    the storage object is a container,
    the container comprises
        a container index file, and
        a container data file, and
    the mapping information is represented by a structure of an inode of the container data file.

6. The method of claim 5, wherein
    the data segment is a deleted data segment, and
    the compacting recycles storage space in the container occupied by the deleted data segment.

7. The method of claim 6, wherein
the storage space is recycled by moving the storage space to an end of the container,
the storage space is moved to the end of the container by changing the mapping information,
the mapping information is changed by assigning a new block number to the deleted data segment, and
the new block number is located after block numbers assigned to the active data segments of the plurality of data segments.

8. The method of claim 4, further comprising:
creating a copy of the mapping information, prior to the compacting the storage object.

9. The method of claim 4, wherein the reordering further comprises:
prior to the address manipulation, retrieving the mapping information into a data structure; and
modifying the mapping information in the data structure.

10. The method of claim 4, wherein
the mapping information maps data blocks of the plurality of data segments to data block addresses of data represented by the plurality of data segments,
the plurality of data segments are in an order within the storage object, and
the data block addresses are in a sequence within the mapping information.

11. The method of claim 1, further comprising:
determining if the compacting was successful; and
if the compacting was successful, invalidating an entry in a page cache, wherein
the entry corresponds to a page containing a copy of the at least a portion of the data.

12. The method of claim 1, further comprising:
determining whether the reordering would result in an unacceptable level of fragmentation, wherein
the data segment is a deleted data segment.

13. The method of claim 12, further comprising:
if the reordering would result in an unacceptable level of fragmentation,
writing one or more active data segments to a spare storage object, and
swapping the storage object and the spare storage object.

14. The method of claim 13, further comprising:
defragmenting the storage object, subsequent to the swapping.

15. A computer program product comprising:
a plurality of instructions, comprising
a first set of instructions, executable on a computer system, configured to identify a data segment from a plurality of data segments within a storage object, wherein
the data segment represents data stored in a storage device,
at least a portion of the data is stored in a data block associated with the data segment, and
the plurality of data segments comprises
active data segments, and
deleted data segments,
a second set of instructions, executable on the computer system, configured to determine whether compaction of the storage object can be performed using address manipulation on a data block address of the data block,
a third set of instructions, executable on the computer system, configured to compact the storage object, in response to a determination that the compaction of the storage object can be performed using the address manipulation on the data block address of the data block, wherein
the storage object is compacted by reordering a set of data segments of the plurality of data segments within the storage object,
the reordering the set of data segments comprises performing the address manipulation on the data block address of the data block,
the reordering the set of data segments changes an order of the set of data segments within the storage object,
the reordering results in the active data segments being stored contiguously within the storage object,
the set of data segments comprises the data segment, and
the data block address is an address of the data block within the storage device; and
a computer readable storage medium, wherein the instructions are encoded in the computer readable storage medium.

16. The computer program product of claim 15, wherein
the data segment is a deleted data segment,
the plurality of data segments are in an order within the storage object,
the data segment is in a first location in the order within the storage object, prior to the reordering,
the data segment is in a second location in the order within the storage object, subsequent to the reordering,
the second location is closer to a first end of the order within the storage object, than is the first location,
another data segment of the set of data segments is an active data segment,
the another data segment is in a third location in the order within the storage object, prior to the reordering,
the another data segment is in a fourth location in the order within the storage object, subsequent to the reordering, and
the fourth location is closer to a second end of the order within the storage object, than is the third location.

17. The computer program product of claim 15, wherein
the data segment and the data block are associated with one another by mapping information,
the mapping information is represented by a structure of an inode,
the data segment is a deleted data segment,
the compacting recycles storage space in a container occupied by the deleted data segment,
the storage space is recycled by moving the storage space to an end of the container,
the storage space is moved to the end of the container by changing the mapping information,
the mapping information is changed by assigning a new block number to the deleted data segment, and
the new block number is located after block numbers assigned to the active data segments of the plurality of data segments.

18. The computer program product of claim 15, wherein
the data segment and the data block are associated with one another by mapping information,
the mapping information maps data blocks of the plurality of data segments to data block addresses of data represented by the plurality of data segments,
the plurality of data segments are in an order within the storage object, and the data block addresses are in a sequence within the mapping information.

19. The computer program product of claim 15, wherein the instructions further comprise:
a fourth set of instructions, executable on the computer system, configured to determine whether the reordering would result in an unacceptable level of fragmentation, wherein
the data segment is a deleted data segment,
a fifth set of instructions, executable on the computer system, configured to write the active data segments to a spare object and swap the storage object and the spare storage object, if the reordering would result in an unacceptable level of fragmentation, and
a sixth set of instructions, executable on the computer system, configured to defragment the storage object, subsequent to the swapping.

20. A system comprising:
one or more processors;
a storage device, wherein
the storage device is coupled to the one or more processors,
the storage device stores data,
at least a portion of the data is stored in a data block,
the data block is located at a data block address, and
the data block address is an address of the data block within the storage device; and
a memory, wherein
the memory is coupled to the one or more processors, and
the memory stores program instructions executable by the one or more processors to
identify a data segment from a plurality of data segments within a storage object, wherein
the data segment represents the data,
the data block is associated with the data segment, and
the plurality of data segments comprises
active data segments, and
deleted data segments,
determine whether compaction of the storage object can be performed using address manipulation on the data block address of the data block, and
compact the storage object, in response to a determination that the compaction of the storage object can be performed using the address manipulation on the data block address of the data block, wherein
the storage object is compacted by reordering a set of data segments of the plurality of data segments within the storage object,
the reordering the set of data segments comprises performing the address manipulation on the data block address of the data block,
the reordering the set of data segments changes an order of the set of data segments within the storage object,
the reordering results in the active data segments being stored contiguously within the storage object, and
the set of data segments comprises the data segment.

* * * * *